(12) United States Patent
Hucker et al.

(10) Patent No.: US 10,851,574 B2
(45) Date of Patent: Dec. 1, 2020

(54) BRAKING DEVICE

(71) Applicant: GEZE GmbH, Leonberg (DE)

(72) Inventors: Matthias Hucker, Marxzell (DE); André Sebastiaan Maria Jansen, Roermond (NL)

(73) Assignee: GEZE GMBH, Leonberg (DE)

( * ) Notice: Subject to any disclaimer, the term of this patent is extended or adjusted under 35 U.S.C. 154(b) by 32 days.

(21) Appl. No.: 15/890,095

(22) Filed: Feb. 6, 2018

(65) Prior Publication Data
US 2018/0313128 A1     Nov. 1, 2018

(30) Foreign Application Priority Data

Feb. 8, 2017   (DE) .................. 10 2017 201 955

(51) Int. Cl.
*E05F 5/02*   (2006.01)
*H02P 3/22*   (2006.01)
(Continued)

(52) U.S. Cl.
CPC ............ *E05F 5/02* (2013.01); *E05F 15/40* (2015.01); *E05F 15/603* (2015.01); *H02P 3/22* (2013.01);
(Continued)

(58) Field of Classification Search
CPC ......... E05F 15/603; E05F 15/608; E05F 5/00; E05F 5/02; H02P 29/02; H02P 3/22; H02P 6/24
See application file for complete search history.

(56) References Cited

U.S. PATENT DOCUMENTS 6,175,204 B1 *   1/2001   Calamatas ............... H02P 7/04
                                                                       318/375
6,329,777 B1 *  12/2001   Itabashi ................. F02D 11/107
                                                                       318/432
(Continued)

FOREIGN PATENT DOCUMENTS

DE        4038199 A1     6/1992
DE   202009000907 U1     6/2010
(Continued)

OTHER PUBLICATIONS

Office Action issued in connection with UK Patent Application No. GB1800891.2 dated Sep. 26, 2019.
(Continued)

*Primary Examiner* — Thai T Dinh
(74) *Attorney, Agent, or Firm* — Steven M. Shape; Dennemeyer & Associates, LLC

(57) ABSTRACT

A braking device for a movable door wing comprises an electric motor operated as a generator with a motor shaft which is rotatable by a movement of the door wing and which expends motion-dependent motor voltage at a contact pair, as well as a braking circuit upon which the motor voltage is applied or applicable and via which, the contact pair is short-circuitable in order to dampen a movement of the door wing. It is provided that the braking circuit comprises two anti-serially arranged field-effect transistors wherein their drain terminals are connected each to another contact of the contact pair and wherein their source terminals are connected to each other and preferably also connected to earth or a zero line, so that the contact pair is short-circuited depending on the switching state of the field effect transistors. Alternatively or in addition to such a design of the braking circuit, provision is made that the electric motor is designed as a brushless electric motor with a plurality of stator coils, in each of which an AC voltage is (Continued)

induced as a function of the movement of the door wing, and that one of the AC voltages induced in the stator coils is outputted at the contact pair. The braking circuit comprises a partial braking circuit to which the alternating voltage output on the contact pair is applied or can be applied and via which, the contact pair can be short-circuited.

13 Claims, 1 Drawing Sheet

(51) Int. Cl.
*E05F 15/603* (2015.01)
*H02P 6/24* (2006.01)
*H02P 29/02* (2016.01)
*E05F 15/40* (2015.01)

(52) U.S. Cl.
CPC .............. *H02P 6/24* (2013.01); *H02P 29/02* (2013.01); *E05Y 2201/21* (2013.01); *E05Y 2201/408* (2013.01); *E05Y 2201/41* (2013.01); *E05Y 2201/434* (2013.01); *E05Y 2400/302* (2013.01); *E05Y 2400/36* (2013.01); *E05Y 2400/40* (2013.01); *E05Y 2900/132* (2013.01)

(56) References Cited

U.S. PATENT DOCUMENTS

| | | | | |
|---|---|---|---|---|
| 6,445,152 B1* | 9/2002 | Calamatas | ............. | B61D 19/02 318/256 |
| 7,170,245 B2* | 1/2007 | Youm | ............... | H02M 7/53875 318/268 |
| 7,571,515 B2* | 8/2009 | Fischbach | ............... | E05F 3/102 16/64 |
| 7,755,312 B2* | 7/2010 | Hirata | ............. | H02P 6/26 318/400.13 |
| 7,940,017 B2* | 5/2011 | Takemasa | ................ | B60R 1/07 318/280 |
| 8,044,617 B2* | 10/2011 | Lee | ............... | B60L 7/003 318/293 |
| 8,258,734 B2* | 9/2012 | Takeuchi | ................ | H02P 6/085 310/156.01 |
| 8,330,406 B2* | 12/2012 | Noie | ............... | H02P 7/04 318/400.01 |
| 9,083,274 B2* | 7/2015 | Liu | ............. | H02P 27/14 |
| 10,122,303 B2* | 11/2018 | Roppongi | ............... | E05F 15/70 |
| 10,273,736 B2* | 4/2019 | Hucker | ................ | E05F 15/603 |
| 2008/0067960 A1* | 3/2008 | Maeda | ................... | B62D 5/046 318/400.02 |
| 2008/0315804 A1* | 12/2008 | Nishibe | ................ | B60R 1/074 318/256 |
| 2010/0225261 A1* | 9/2010 | Takeuchi | ............... | H02P 6/085 318/400.29 |
| 2011/0185941 A1* | 8/2011 | Gonzalez Fernandez | ................... | B61D 19/026 105/341 |
| 2018/0183361 A1* | 6/2018 | Kadoya | ............. | H02P 3/12 |
| 2018/0312370 A1* | 11/2018 | Saarelainen | ............... | B66B 1/32 |
| 2019/0071915 A1* | 3/2019 | Hucker | ................ | E05F 15/63 |

FOREIGN PATENT DOCUMENTS

| | | |
|---|---|---|
| DE | 102010035798 A1 | 3/2011 |
| DE | 102013016216 A1 | 4/2015 |
| DE | 102015200284 B3 | 10/2015 |
| WO | 2016113012 A1 | 7/2016 |

OTHER PUBLICATIONS

Combined Search and Examination Report issued by the United Kingdom Intellectual Property Office in connection with Application No. GB 1800891.2 dated Jul. 19, 2018.

* cited by examiner

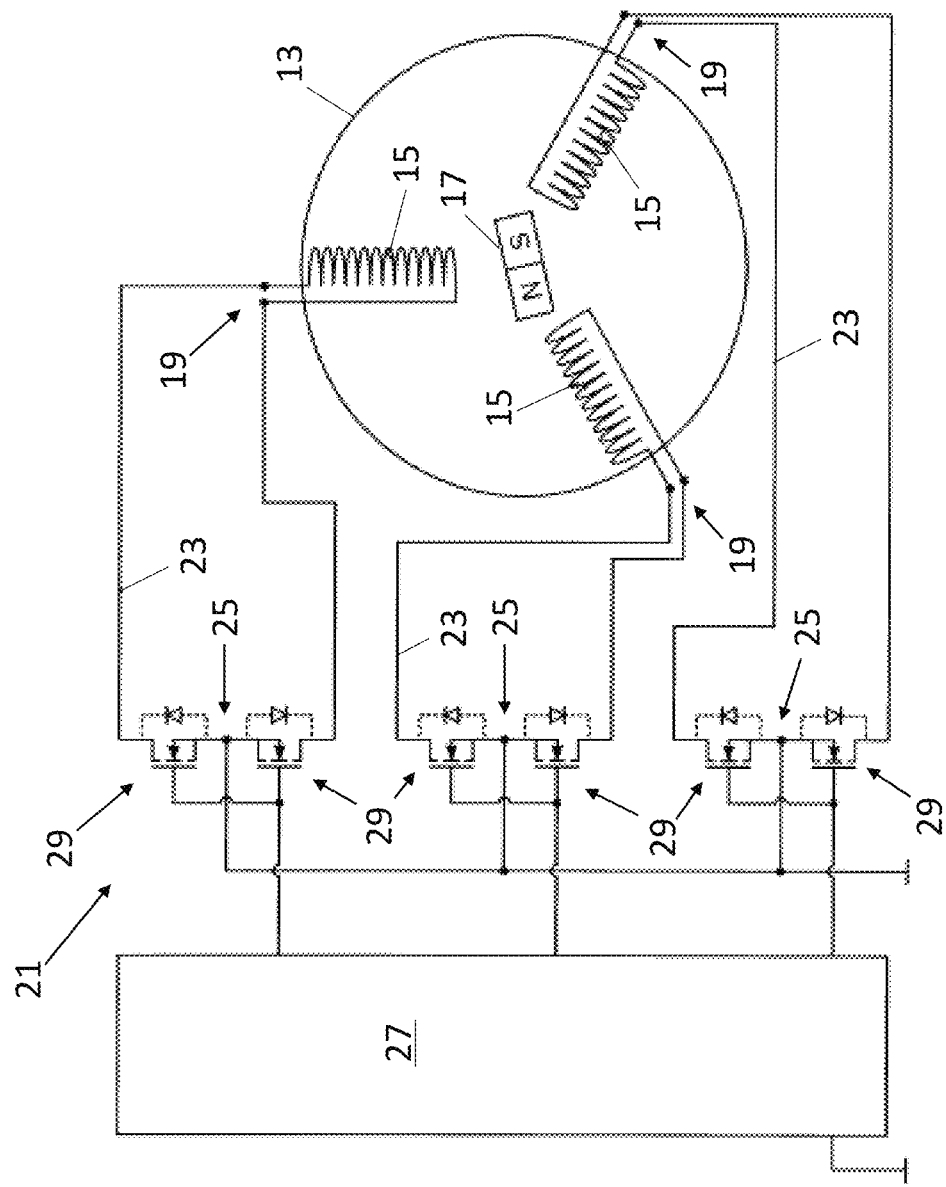

BRAKING DEVICE

CROSS-REFERENCE TO RELATED APPLICATIONS

This application claims priority to German application 102017201955.7, filed Feb. 8, 2017, which is hereby incorporated by reference in its entirety.

The present invention relates to a braking device for a movable door wing.

Door closers for movable door wings using a mechanical energy accumulator and a braking device are known from the prior art. When opening the door, the mechanical energy accumulator is charged with potential energy, which closes the released door wing again. The mechanical energy accumulator is constructed, for example, as a spring, which is tensioned by the opening of the door wing. After that, the potential energy in the spring closes the door. The closing moment of the door wing is thereby determined by the current spring tension and the different transmission ratios in the system. The closing speed itself is damped in the braking device, for example, by oil in a damper. The desired closing properties of the door wing can be set through various hydraulic valves and their configuration. This allows for a cost effective, self-sufficient implementation of the door closer, i.e. the door closer works without an external energy supply.

However, the closing speed of the door wing with valves is only adjustable to a certain extent. For example, an end impact function always has the same application point, because only the passage, but not the position of the valve is adjustable. Furthermore, the implementation of functions that depend on the current speed of the door wing, is a time-consuming process. The regulation of the closing speed, for example to a desired closing time of the door wing, is also difficult to implement. The valves can only be adjusted on a trial and error basis. If then the temperature of the damper oil or the friction conditions in the door closer change, the closing time also changes. In addition, escaping damper oil can lead to pollution of the environment if the door closer develops a leak and the damper oil then has to be disposed of. Furthermore, oil from the damper is usually flammable, which, when escaping in the event of fire, could contribute to the spreading of a fire.

In order to avoid such disadvantages, the braking device can comprise a generator-operated electric motor with a motor shaft which is rotatable by a movement of the door wing and which expends motion-dependent motor voltage to a contact pair; it also comprises a braking circuit to which the motor voltage is applied or applicable and via which, the contact pair is short-circuitable in order to dampen a movement of the door wing. As such, the damping is not carried out because damper oil is forced by valves, but because the generator-operated electric motor generates electrical energy that is consumed by the short-circuiting. Such a braking device can also be provided in a non-electrically operated door closer. This is because, in principle, no power source is required in order to operate the braking device. Thus, a braking device with a generator-operated, short-circuitable electric motor can enable an autonomous implementation of the door closer. Depending on the design, the braking device, especially the said braking circuit, can also have switching elements, which require a power supply in order to be actuated. Moreover, the braking device can be foreseen for inclusion in an electric door drive where the electric motor then, in addition to its function as generator of the braking device, can at the same time also serve as motor of the door drive requiring power supply.

A door drive for actuating a movable door wing with such a braking device is known from DE 10 2005 028 007 B4. The braking circuit of this braking device has a switching element designed as a field-effect transistor, via which the motor terminals of the electric motor can be short-circuited. A drain-source path of the field effect transistor is arranged in the braking circuit and a voltage between the gate and source of the field effect transistor is set via a potentiometer which is arranged in parallel with the drain-source path of the field effect transistor. A voltage tap of the potentiometer is connected to the gate terminal of the field effect transistor. Thus, the field effect transistor is operated as a voltage-dependent load resistance for the electric motor, in such a manner that the braking force of the braking device is dependent on the output voltage of the generator-operated electric motor and which can be set via the potentiometer.

This type of braking device is known from DE 10 2015 200 284 B3. This brake device has an evaluation and control unit, which performs a pulse width modulation of the motor current via a switching element in the braking circuit and in this way, sets an effective braking force to dampen the movement of the door wing. This way, the desired closing properties can be set particularly flexible. The pulse width modulation of the motor current caused by the evaluation and control unit can be preselected in a variety of ways and in particular, can depend on conditions detectable by sensors, e.g. the current closing speed or the angular position of the door wing, so that regulation of the closing speed is possible in order to achieve the desired closing mode.

By means of such braking devices, the movement of the respective door wing can be damped, however as a rule, not by bringing it to a standstill altogether, at least not against a force acting on the door wing, e.g. as caused by a tensioned spring, as described above. This is because the damping takes place in such a way that the generator-operated electric motor is loaded by short-circuiting the contact pair, so that the movement energy is withdrawn. However, this presupposes that the electric motor outputs a motor voltage at all, which in turn presupposes a movement of the door wing. Slowing down the movement of the door wing subsequently leads to a reduction of the damping by the braking device, so that the speed of the door is indeed restricted, but does not decrease to zero, as long as the wing of the door is still driven to move, for example by means of a movement by a spring pre-tensioning.

But there may be reasons to achieve damping that is at least as powerful, so that the door wing moves as slowly as possible, and in particular, closes as slowly as possible. For example, particularly powerful damping may be expedient if physically impaired persons or several persons have to pass a door in succession. Powerful damping can also be useful within the context of a sequential control device, e.g. the movable wing of a double-wing door should close only when the fixed wing is closed or at least already past the moveable wing. The same applies to a sequential control device between different doors, e.g. for the two doors of a porch. Furthermore, a sensor may also be provided on a door in order to detect whether, persons are in the doorway. The wing of the door may be dampened particularly powerfully, in order to reduce the risk of injury by the door wing.

As a general rule, particularly powerful damping can be achieved by the simplest possible low-impedance short circuit, e.g. by directly connecting the two contacts of the motor contact pair. While, in the case of a complex braking circuit, such as, for example, in the braking circuit in accordance with the embodiment shown in FIG. 2 of DE 10 2015 200 284 B3, the maximum possible damping can be reduced in such a way that a part of the motor voltage drops across elements of the braking circuit and as a consequence can no longer be used for damping. For example, in the case of the braking circuit shown in DE 10 2015 200 284 B3, a voltage of approximately 1 V can drop across the diode bridge for rectification at an amperage of approximately 3 A; On the field effect transistor, there may be a drop of about 0.06 V in the case of 3 A and a switch-on resistance $R_{DS(on)}$ of the field-effect transistor of about 20 mΩ.

In this way, the simplest possible brake circuits basically appear to be advantageous. However, in the event of a direct short circuit of the contact pair, there is no regulation of the closing speed and no distinction of the polarity of the motor voltage and thus no differentiation of the direction of movement of the door is possible, so that an opening of a door wing would always be equally damped as a closure. In order to be able to specify the respective closing properties as flexibly as possible, it is advantageous that different damping modes can be set for the closing and opening of a door wing, in particular also in such a way that exclusively the closing or also exclusively the opening of the wing is damped. Directionally adjustable damping is also advantageous in that the braking device can then be applied equally to a DIN left door as well as to a DIN right door (stop side in accordance with DIN 107).

The aim of the invention is to provide a braking device for a movable door wing, which enables a direction-dependent damping and which achieves a short-circuit of the electric motor (operated as a generator) with an impedance that is as low as possible, wherein said electric motor is a brushless electric motor stimulated with a permanent magnet in order to achieve the most powerful damping possible.

This task is achieved by a braking device comprising the features of claim 1. Advantageous embodiments of the invention are the result of the dependent claims, the present description as well as the drawings.

According to the invention, this braking device comprises two field-effect transistors arranged anti-serially. The two field effect transistors are thus arranged in series, but aligned in opposite directions, in such a way that the source terminals of the two field effect transistors are connected to one another. Preferably, the source terminals are also connected to earth or a zero line, so that they are at the same defined potential. In addition, the drain connections of the two field effect transistors are connected to a respective other contact of the aforementioned contact pair of the electric motor. In this way, the contact pair is short-circuited depending on the switching state of the field effect transistors. Due to the anti-serial arrangement of the two field-effect transistors, it depends on the respective polarity of the motor voltage applied to the contact pair, via which of the field effect transistors the contact pair is then short-circuited.

Through such a design of the braking circuit, a particularly simple and direct low-impedance short circuiting of the contact pair can be achieved. In addition, because of the anti-serial arrangement of the two field-effect transistors, no separate rectification of the motor voltage is required, resulting in a comparatively small drop in voltage. For example, the voltage drop at an amperage of about 3 A and a switch-on resistance $R_{DS(on)}$ of about 20 mΩ per field effect transistor can only as low as 0.12 V. As a result, the braking circuit is comparatively efficient and this leads to a more powerful damping of the door wing.

At the same time, the damping of the door wing can be adjusted in the one direction of movement, in principle independently of the damping of the door wing in the opposite direction of movement. This is because damping in the one direction of movement in principle can be controlled by switching of the one field effect transistor and the damping in the other direction of movement by switching of the other field effect transistor. In this case, means for switching the respective field effect transistor can be integrated into the braking circuit. For example, the braking circuit can be designed in such a way that the resistance of a respective field effect transistor changes in direct dependence on the applied motor voltage.

According to a preferred development, a control unit is provided with which the gate terminals of the field effect transistors are connected, so that the field effect transistors can be switched by means of the control unit. In principle, the gate terminal of only one of the two field effect transistors can also be connected to the control unit, while the other field effect transistor is switched in another way. However, a compact design can result from the fact that both field-effect transistors can be switched by means of the same control unit of the braking device. Preferably, the control unit is designed as an evaluation and control unit, which can also receive values and/or signals or can independently determine and then evaluate. In this way, the controlling of other elements by means of the evaluation and control unit, especially the switching of the field effect transistors of the braking circuit, can also be dependent on the result of such an evaluation. The control unit can, in particular, comprise a microcontroller. In addition, the control unit can be designed to control the damping depending on detected variables, for example. the speed of the door wing. Particularly flexible, adjustable controlling of the damping is possible, especially when using a microcontroller.

Preferably, the control unit is designed to switch the field effect transistors in such a way that a pulse width modulation of the current flowing in the braking circuit takes place, through which a braking force for damping the movement of the door wing can be set. The field effect transistors can, at least, be switched exclusively between a conductive switching state and a blocking switching state, wherein the average strength of the short circuit and thus the strength of the damping acting on the wing of the door can be specified by the ratio of the respective switching pulse durations. This way, the damping properties of the braking device can be set in a way that is very flexible and direction-dependent.

This task cited above is also achieved by a braking device comprising the features of independent claim 4.

In this case, this braking device, can be designed as the braking device described above or one of its embodiments. However, this is not absolutely necessary. The electric motor of this braking device is designed as a brushless electric motor with a plurality of stator coils, in each of which, an alternating voltage is induced as a function of the movement of the door wing. According to the invention, it is further provided that the electric motor, on the contact pair, expends one of the alternating voltages induced in the stator coils and that the braking circuit comprises a partial braking circuit to which the alternating voltage output on the contact pair is applied or can be applied and by means of which, the contact pair can be short-circuited.

Among other things, the invention forming the basis of claim 4 is based on the following finding: Brushless, electric motors stimulated with a permanent magnet are suitable in achieving a particularly powerful damping. This is because with such electric motors, no commutation is needed for the damping. In addition, such electric motors can deflect the damping energy in the form of heat comparatively well.

However, the stator coils of a brushless permanently excited electric motor are usually connected in accordance with a star connection or a triangular circuit, and/or in the case of more than three coils, according to a polygon circuit corresponding to the number of coils. In the case of a star connection, the AC voltage expends at the motor terminals of the electric motor, the so-called star voltage, is reduced by a factor of √3 in the case of three coils compared to the voltage between two outer conductors of the star connection. In the case of a polygonal circuit, on the other hand, the current output at the motor terminals is reduced compared to the currents in the individual outer conductors, and in the case of three coils, in turn, by a factor of √3. It is therefore clear that in each case, short circuiting the usual motor terminals does not achieve the maximum damping, so that another starting point for an improved braking device with the greatest possible damping arises.

Therefore, according to claim 4, at least one of the stator coils of the electric motor is individually short-circuited in a braking device for damping the movement of the door wing. For this purpose, the respective partial braking circuit of the braking device is connected in a special way to the electric motor, i.e. not via the usual motor terminals, where usually a DC voltage is outputted, but via a respective contact pair to which the AC voltage of a single stator coil is applied. This is advantageous in that a higher braking effect on the electric motor can be achieved by shorting individual stator coils, so that the damping effect is stronger.

In this case, it is preferable that the electric motor comprises a plurality of contact pairs, at which the electric motor outputs a respective voltage different to the alternating voltages induced in the stator coils, and that the braking circuit comprises a plurality of partial braking circuits, via which a respective contact pair different to the contact pairs can be short-circuited. In this way, the electric motor is not braked by means of a single stator coil, but by means of several, which in each case, can be shorted individually via a respective partial braking circuit. This in turn increases the braking effect, so that the door wing can be dampened more strongly.

In particular, the electric motor may have a number of contact pairs corresponding to the number of stator coils, and the braking circuit may comprise a number of partial braking circuits corresponding to the number of stator coils. In such an embodiment, therefore, all the stator coils of the electric motor can be advantageously short-circuited via a respective partial braking circuit. In this case, a respective contact pair is provided on the electric motor for each stator coil, to which a partial braking circuit is and/or can be connected in order to short-circuit the respective stator coil.

Since, in such an embodiment, each stator coil can be contacted via a respective pair of contacts, the stator coils of the electric motor need not be interconnected in the usual manner, e.g. according to a star connection or a triangular and/or a different type of polygon circuit. This allows for a simplified design of the electric motor.

The individual partial braking circuits are preferably formed separately from each other. In particular, the braking circuit can be designed in such a way that different pairs of contacts of the electric motor are short-circuited via completely separate paths, which do not have a common partial section. The individual partial braking circuits can, in principle, be designed differently independently of each other. Preferably, however, the partial braking circuits are designed to match each other so that the stator coils can be short-circuited in mutually coincident manner. In this case, a single current circuit can basically be formed in any way in which a brake circuit of a conventional brake device can also be designed for short circuiting the motor terminals of a generator-operated electric motor.

Preferably, each partial braking circuit each comprises a switching element, via which the contact pair that can be short-circuited by the partial braking circuit is short-circuited depending on the switching state of the switching element. Thus, by switching the switching element, the braking effect of the respective partial braking circuit can be adjusted. In this case, means for switching the switching element can be integrated into the respective partial braking circuit. For example, the partial braking circuit can be designed in such a way that the resistance of its switching element changes in direct dependence on the voltage applied to the voltage applied to the partial braking circuit.

According to a preferred further development, a control unit is provided, by means of which the switching element of a respective partial braking circuit, especially of each partial braking circuit, can be switched. Preferably, the control unit is designed as an evaluation and control unit, which can also receive values and/or signals or can independently determine and then evaluate. In this way, the controlling of other elements by means of the evaluation and control unit, especially the switching of the field effect transistors of the braking circuit, is also dependent on the result of such an evaluation. The control unit may, in particular, comprise a microcontroller. In addition, the control unit can be designed to control the damping as a function of detected variables, like for example. the speed of the door wing. Particularly flexible, adjustable controlling of the damping is possible, especially when using a microcontroller.

Preferably, the control unit is designed to switch the switching element of at least one driving brake circuit, in particular of at least one partial braking circuit in such a way that a pulse width modulation of the current flowing in the braking circuit takes place, through which a braking force for damping the movement of the door wing can be set. The switching element can, at least, be switched at least substantially exclusively between a conductive switching state and a blocking switching state, wherein as a result of the ratio of the respective switching pulse durations, it is possible to specify the average strength of the short circuit of the respective stator coil and thus the strength of the overall damping acting on the door. This way, the damping characteristics of the braking device can be set in a very flexible way According to a further advantageous embodiment, the braking circuit comprises a plurality of partial braking circuits, wherein the control unit is designed to switch the switching elements of different partial braking circuits independently of each other. In particular, the switching elements of the various partial braking circuits do not necessarily need to be switched in such a way that the switching state in the partial braking circuits corresponds in each case. However, it can be expedient to switch the switching elements of the various partial braking circuits not completely individually, but in a coordinated manner, especially taking into account the circulating voltage induction in the stator coils of the electric motor when the motor shaft rotates.

Preferably, at least one partial braking circuit, especially each partial braking circuit, comprises two anti-serially arranged field-effect transistors as the aforementioned switching element. As such, the two field effect transistors are arranged in series, but oppositely oriented in such a way that the source terminals of the two field effect transistors are interconnected. Preferably, the source terminals are also connected to earth or a neutral line, so that they are at the same defined potential. In addition, the drain terminals of the two field effect transistors are connected to a respective other contact of the contact pair of the electric motor which is short-circuited by the partial braking circuit. In this way, the respective contact pair and thus the respective stator coil whose AC voltage is expended on the contact pair, are short-circuited depending on the switching state of the field effect transistors. Due to the antiserial arrangement of the two field effect transistors, it depends on the respective polarity of the voltage applied to the contact pair, as to via which of the field effect transistors is then used to short-circuit. the contact pair.

According to a preferred development, the gate connections of the field effect transistors are connected to the aforementioned control unit so that the field effect transistors can be switched by means of the control unit. Specifically, the control unit can be designed to switch the field effect transistors in such a way that a pulse width modulation of the current flowing in the partial braking circuit takes place, through which a braking force for damping the movement of the door wing is adjustable, as has already been explained above.

While, in the case of a braking device with a generator-operated DC motor, the polarity of the motor voltage output at the motor terminals usually depends on the direction of movement of the door wing, however, in the embodiments described above, an AC voltage is outputted at a respective contact pair. In this respect, it can be advantageous if a respective partial braking circuit short-circuits the respective contact pair in a manner which is independent of the respective polarity of the voltage. According to a preferred development, the gate terminals of the field effect transistors of a respective partial braking circuit are therefore also connected to each other, so that the two anti-serially arranged field effect transistors are jointly switchable by means of the control unit and in particular, they each have the same switching state.

Furthermore, it is possible to provide that the gate terminals of the field effect transistors of different, and in particular, all partial braking circuits are interconnected, so that they can be switched together.

Both by the fact that the individual stator coils of the electric motor can be individually shorted via a respective contact pair and a respective partial braking circuit connected to them, as well as by the described anti-serial arrangement of two field effect transistors with connected source terminals as a switching element of a respective partial braking circuit, the efficiency of a braking device according to the invention can be substantially improved over conventional braking devices, so that more powerful damping can be achieved.

For example, in a door closer with a closing strength of EN4, a conventional braking device which comprises a conventional DC motor, a diode bridge for alignment and a pulse-width modulated field-effect transistor can dampen a 90° open door wing to a maximum closing time of 20 s, which corresponds to an average closing speed of 4.5°/s. By short-circuiting each individual stator coil of the electric motor via its own partial braking circuit, each comprising two anti-serially arranged field effect transistors with connected source terminals, the closing time can be increased to up to 3 minutes, which would then correspond to a mean speed of 0.5°/s and significantly increased damping.

In addition, by means of a corresponding control of the switching elements in the partial braking circuits, especially by means of the aforementioned control unit, the damping can also be direction-dependent even though alternating currents are short-circuited, the alternating polarity of which cannot be used to differentiate the direction. In the simplest case, this is achieved, for example, when the direction of movement of the door wing is detected separately and the switching elements in the partial braking circuits are switched in a different manner in pulse width modulation, depending on the direction of movement. Thus, in the manner in accordance with the invention, not only is particularly strong damping achieved, but in addition, flexible adjustment of the damping is possible which in particular, is direction-dependent.

The invention will be explained in more detail below by way of example, with reference to the illustration.

BRIEF DESCRIPTION OF THE DRAWINGS

FIG. 1. is a circuit diagram of an embodiment of the braking device disclosed herein.

The illustration shows a possible embodiment of a braking device 11 according to the invention in a schematic representation based on a circuit diagram. The braking device 11 comprises a brushless permanent-magnetically excited electric motor 13, which comprises three stator coils 15 which are regularly distributed and arranged in a circumferential direction. The rotor 17 of the electric motor 13 is designed as a permanent magnet in the centre between the stator coils 15 and this is connected to the motor shaft of the electric motor 13 (not shown) for common rotation. Unlike, as is the case with a conventional DC motor, the stator coils 15 are not interconnected.

The braking device 11 is provided to dampen the movement of a movable door wing (not shown), wherein the braking device 11 can be part of a door closer or a door drive for the door wing. The motor shaft of the electric motor 13 is coupled to the door in such a way that a movement of the door wing leads to a rotation of the motor shaft. As a result, the rotor 17 also rotates about an axis perpendicular to the plane of representation. By the rotation of the rotor 17, AC voltages are induced in the stator coils 15, which are consequently dependent on the movement of the door wing.

The electric motor 13 has a respective contact pair 19 for each of the three stator coils 15, at the two contacts of which the alternating voltage generated at the respective stator coil 15 can be outputted. In this respect, the electric motor 13 thus outputs no DC voltage, but a plurality of AC voltages as the motor voltage in such an embodiment.

The braking device 11 further includes a braking circuit 21 which is configured to short circuit the electric motor 13 so as to dampen the movement of the door wing. Because of the short circuit, the electric motor 13 is provided with a load which leads energy to be extracted from the movement of the door wing. For short-circuiting the electric motor 13, the braking circuit 21 is not only connected to a single pair of contacts 19, but at all three pairs of contacts 19 at the same time.

For this purpose, the brake circuit 21 comprises three partial brake circuits 23, wherein each partial brake circuit 23 is connected to another one of the three pairs of contacts 19, so that the AC voltage output at a respective contact pair 19 is applied to the corresponding partial brake circuit 23. In this way, each contact pair 19 can be short-circuited via one of the partial braking circuits 23. This allows a direct short-circuiting of the individual stator coils 15, through which a more effective dissipation of energy can be achieved and as such, a more powerful damping of the door wing, as if the electric motor 13 would be short-circuited in the usual way via its motor terminals, where it outputs a DC voltage.

The three partial braking circuits 23 are at least substantially identical in design and each have a switching element 25 via which the contact pair 19, which can be short-circuited by the respective partial braking circuit 23, is short-circuited depending on the switching state of the switching element 25. The switching elements 25 of all three sub-braking circuits 23 are switched by means of the same control unit 27 of the braking device 11, which is shown as a simplified form in the illustration as a block. In particular, the control unit 27 comprises a microcontroller and it can also comprise further components, especially components which can be controlled by means of the microcontroller for outputting a pulse width modulated signal.

The control unit 27 is connected to the three switching elements 25 of the partial braking circuits 23 via three outputs. This way, the switching elements 25 can basically be switched independently of each other. In each case, the switching of the switching elements 25 especially takes place in a way which is pulse-width modulated in order to influence the damping of the door wing in a desired manner via the pulse-width modulation of the short circuit.

In each case, each of the three partial braking circuits 23 comprises two anti-serially arranged field-effect transistors 29 as a switching element 25. In this case, the two field effect transistors 29 are each connected directly to one another via their source connections. In addition, the source terminals of the field-effect transistors 29 of all partial braking circuits 23 are connected together to the ground or a neutral line, so that they lie at the same defined potential.

In each partial braking circuit 23, the gate terminals of the two field-effect transistors 29 are also connected to each other and to the control unit 27. As a result, the control unit 27 can output a voltage relative to the defined potential of the source terminals to the gate terminals of the two field effect transistors 29 of a respective partial braking circuit 23. In this way, the two anti-serially arranged field-effect transistors 29 of a respective partial braking circuit 23 can be jointly switched by means of the control unit 27, as a result of which a switching of the AC voltage output at the respective contact pair 19 is achieved overall.

If the field-effect transistors 29 of a respective partial braking circuit 23 are switched on in this manner, the corresponding stator coil 15 is short-circuited with low impedance and comparatively low losses. In this respect, the described construction of the three partial braking circuits 23 contributes to a comparatively powerful damping of the door wing, without the force of the damping being permanently predefined. By controlling the partial braking circuits 23 by means of the control unit 27, the damping can be set flexibly and in particular, direction-dependent as well.

Thus, on the one hand, the stator coils 15 of the electric motor 13 are individually short-circuited via a respective partial braking circuit 23, and on the other hand, a respective partial braking circuit 23 is comprised of two anti-serially arranged field effect transistors 29 with connected source connections, which overall, can achieve a particularly powerful damping of the movement of the door wing and can still be flexibly adapted to achieve desired damping properties.

REFERENCE NUMERALS

11 Braking device
13 Electric motor
15 Stator coil
17 Rotor
19 Contact pair
21 Braking circuit
23 Partial braking circuit
25 Switching element
27 Control unit
29 Field-effect transistor

The invention claimed is:

1. A braking device (11) for a movable door wing, comprising:
    an electric motor (13) operated as a generator with a motor shaft which is rotatable by a movement of the door wing and which expends motion-dependent motor voltage at a contact pair (19); and
    a braking circuit (21) upon which the motor voltage is applied and via which the contact pair (19) is short-circuitable in order to dampen the movement of the door wing,
    wherein the braking circuit (21) comprises two field-effect transistors (29), arranged anti-serially,
    wherein the two field-effect transistors include gate terminals connected to each other, drain terminals each connected to a respective contact of the contact pair (19) and source terminals connected to each other and to earth or a neutral line such that the contact pair is short-circuited depending on a switching state of the two field-effect transistors (29).

2. The braking device according to claim 1, further comprising a control unit (27) connected to the gate terminals of each of the two field-effect transistors (29), such that the two field-effect transistors (29) can be switched by the control unit (27).

3. The braking device according to claim 2, wherein the control unit (27) is configured to switch the field-effect transistors (29) in such a way that a pulse width modulation of current flowing in the braking circuit (21) takes place, through which a braking force for damping the movement of the door wing can be set.

4. The braking device according to claim 1,
    wherein the electric motor (13) is a brushless electric motor including a plurality of stator coils (15), an alternating voltage is induced in each stator coil of the plurality of stator coils as a function of the movement of the door wing,
    wherein the electric motor (13) outputs one of the alternating voltages induced in the plurality of stator coils (15) as an alternating voltage output on the contact pair (19) and the braking circuit (21) comprises a partial braking circuit (23) to which the alternating voltage output at the contact pair (19) is applied and via which the contact pair (19) can be short-circuited.

5. The braking device according to claim 4, wherein the electric motor (13) comprises a plurality of contact pairs (19), at which the electric motor outputs a respective voltage different from the alternating voltages induced in the plurality of stator coils (15),
    and the braking circuit (21) comprises a plurality of partial braking circuits (23), via which a respective contact pair different from the contact pairs (19) can be short-circuited.

6. The braking device according to claim 5, wherein the electric motor (13) has a plurality of contact pairs (19) corresponding to a plurality of the plurality of stator coils (15),
    and the plurality of partial braking circuits (23) corresponding to the plurality of stator coils (15).

7. The braking device according to claim 6, wherein each partial braking circuit (23) of the plurality of partial braking circuits (23) comprises a switching element (25), via which the contact pair (19) that can be short-circuited by the partial braking circuit (23) is short-circuited depending on a switching state of the switching element (25).

8. The braking device according to claim 7, further comprising a control unit (27), wherein the switching element (25) of a respective partial braking circuit (23) of the plurality of partial braking circuits (23) is switched by the control unit (27).

9. The braking device according to claim 8, wherein the control unit (27) is configured to switch the switching element (25) of at least one partial braking circuit (23) of the plurality of partial braking circuits (23) such that pulse width modulation of current flowing in the at least one partial braking circuit (23) takes place through which a braking force for damping the movement of the door leaf is adjustable.

10. The braking device according to claim 8, wherein the control unit (27) is configured to switch the switching element (25) of different partial braking circuits (23) of the plurality of partial braking circuits (23) independently of each other.

11. The braking device according to claim 7, wherein at least one partial braking circuit (23) of the plurality of partial braking circuits (23) comprises the two field-effect transistors (29) as the switching element (25), and
wherein drain terminals of the two field-effect transistors (29) can be short-circuited from the at least one partial braking circuit (23).

12. The braking device of claim 7, further comprising a control unit (27), wherein the gate terminals of the two field-effect transistors (29) are connected to the control unit (27) such that the two field-effect transistors (29) can be switched by the control unit (27).

13. A braking device (11) for a movable door wing, comprising:
an electric motor (13) operated as a generator with a motor shaft which is rotatable by a movement of the door wing and which expends motion-dependent motor voltage at a contact pair (19);
a braking circuit (21) upon which the motor voltage is applied and via which the contact pair (19) is short-circuitable in order to dampen the movement of the door wing,
wherein the braking circuit (21) comprises two field-effect transistors (29), arranged anti-serially, the two field-effect transistors including gate terminals connected to each other, drain terminals connected to a respective contact of the contact pair (19) and source terminals connected to each other and to earth or a neutral line such that the contact pair is short-circuited depending on a switching state of the two field-effect transistors (29); and
a control unit (27) connected to the gate terminals of the two field-effect transistors (29) such that the two field-effect transistors (29) can be switched by the control unit (27).

* * * * *